(12) United States Patent
Aoi

(10) Patent No.: US 8,833,142 B2
(45) Date of Patent: Sep. 16, 2014

(54) NON-RESONANT KNOCKING SENSOR AND METHOD FOR PRODUCING THE SAME

(75) Inventor: Katsuki Aoi, Kani (JP)

(73) Assignee: NGK Spark Plug Co., Ltd., Aichi (JP)

( * ) Notice: Subject to any disclaimer, the term of this patent is extended or adjusted under 35 U.S.C. 154(b) by 305 days.

(21) Appl. No.: 13/530,487

(22) Filed: Jun. 22, 2012

(65) Prior Publication Data

US 2012/0324983 A1 Dec. 27, 2012

(30) Foreign Application Priority Data

Jun. 23, 2011 (JP) ................................. 2011-139498
Apr. 25, 2012 (JP) ................................. 2012-099544

(51) Int. Cl.
*G01L 23/22* (2006.01)

(52) U.S. Cl.
CPC ................................. *G01L 23/222* (2013.01)
USPC ........................................................ 73/35.11

(58) Field of Classification Search
CPC ...... G01L 23/22; G01L 23/221; G01H 11/08; F02D 35/027
USPC ............................................. 73/35.11, 35.13
See application file for complete search history.

(56) References Cited

U.S. PATENT DOCUMENTS

| | | | |
|---|---|---|---|
| 6,752,005 B2 | 6/2004 | Harada et al. | |
| 7,178,383 B2 * | 2/2007 | Shibata et al. | ............... 73/35.11 |
| 7,201,038 B2 | 4/2007 | Kohashi et al. | |
| 2001/0020384 A1 * | 9/2001 | Mueller et al. | ............... 73/35.11 |
| 2003/0200790 A1 | 10/2003 | Harada et al. | |
| 2004/0250603 A1 | 12/2004 | Harada et al. | |
| 2006/0081034 A1 | 4/2006 | Kohashi et al. | |

FOREIGN PATENT DOCUMENTS

| | | |
|---|---|---|
| JP | 2003-322580 A | 11/2003 |
| JP | 2006-112953 A | 4/2006 |

* cited by examiner

*Primary Examiner* — Hezron E Williams
*Assistant Examiner* — David Z Huang
(74) *Attorney, Agent, or Firm* — Sughrue Mion, PLLC

(57) ABSTRACT

A non-resonant knocking sensor including a sensor body including: a metal shell having a shell-side cylindrical section, a piezoelectric element, a weight and a fixing portion having a fixing-side cylindrical section; and a resin molded body. The fixing-side cylindrical section includes crimped portions to be crimped and spaced-apart portions which are spaced apart from the shell-side cylindrical section, and a space between the outer circumferential surface of the shell-side cylindrical section and an inner circumferential surface of the spaced-apart portions are filled with the resin. Also disclosed is a method for producing the non-resonant knocking sensor.

5 Claims, 7 Drawing Sheets

NON-RESONANT KNOCKING SENSOR AND METHOD FOR PRODUCING THE SAME

BACKGROUND OF THE INVENTION

1. Field of the Invention

The present invention relates to a non-resonant knocking sensor for detecting knocking vibration in an internal combustion engine and to a method for producing the non-resonant knocking sensor.

2. Description of the Related Art

A knocking sensor for detecting a knocking phenomenon is disposed in internal combustion engines of automobiles etc., and control is performed to suppress the generation of the knocking phenomenon according to the detection signal output from the knocking sensor. More specifically, delay angle control for changing the ignition timing of an ignition plug in an internal combustion engine is performed according to the output signal of the knocking sensor.

As the above-mentioned knocking sensor, those having various configurations have been proposed (for example, refer to JP 2003-322580A and JP 2006-112953A). Among the knocking sensors, a knocking sensor having a configuration shown in FIGS. 6 and 7 is known as disclosed in JP 2003-322580A. This knocking sensor 101 is installed in a cylinder block serving as one component constituting an internal combustion engine. It is a so-called center-hole-type non-resonant knocking sensor in which an installation hole 114 that is used when the knocking sensor 101 is installed in the cylinder block is formed at the central area thereof As shown in the exploded view of FIG. 7, the knocking sensor 101 mainly has a metal shell 111 having a cylindrical section 112 and a flange section 113 formed at the lower end of the cylindrical section 112; and a lower insulating plate 116, a lower electrode plate 117, a piezoelectric element 119, an upper electrode plate 120, an upper insulating plate 122, a weight 123, and a belleville spring 124, each formed into an annular shape. The lower insulating plate 116, the lower electrode plate 117, the piezoelectric element 119, the upper electrode plate 120, the upper insulating plate 122, the weight 123, and the belleville spring 124 are fitted around the outer circumference of the cylindrical section 112 in this order from the side of the flange section 113.

At the radially outward end sections of the lower electrode plate 117 and the upper electrode plate 120, an upper terminal 121 and a lower terminal 118, from each of which a voltage is delivered, are provided so as to extend radially outward in a strip shape. An externally threaded section 115 is formed on the upper side of the outer circumferential surface of the cylindrical section 112. On the other hand, an internally threaded section 126 to be engaged with the externally threaded section 115 is formed on the inner surface of a nut 125. When the internally threaded section 126 of the nut 125 is threadedly engaged with the externally threaded section 115 of the cylindrical section 112, the nut 125 moves toward the flange section 113, and the stacked components ranging from the lower insulating plate 116 to the belleville spring 124 are pressed by the nut 125 toward the flange section 113 and fixed thereto (see FIG. 6).

The sensor body 110 configured as described above is covered with a resin molded body 140, to thereby form the knocking sensor 101. The knocking sensor 101 having this configuration is installed so that the lower surface of the flange section 113 of the metal shell 111 makes contact with the cylinder block and is used in this state.

3. Problems to be Solved by the Invention

In the knocking sensor 101 described in Patent Document 1 described above, when the internally threaded section 126 of the nut 125 is threadedly engaged with the externally threaded section 115 of the cylindrical section 112, there is a problem in that plated layers formed on the surfaces of the nut 125 and the cylindrical section 112 are peeled off and plating debris is likely to be generated. If such plating debris makes contact with the metal shell 111 and the lower electrode plate 117 or the metal shell 111 and the upper electrode plate 120, there is a danger that the knocking sensor 101 cannot output its detection signal accurately.

For the purpose of solving the above-mentioned problem, Patent Document 2 has disclosed a technology in which a cylindrical stopper ring is used instead of the nut 125 to press the stacked components ranging from the lower insulating plate to the weight toward the flange section. In this case, a groove section is formed on the outer circumferential surface of the cylindrical section of the metal shell facing the stopper ring, and the stopper ring is crimped onto the groove section, whereby the stopper ring is fixed to the cylindrical section.

With this configuration, the process of threadedly engaging the externally threaded section with the internally threaded section can be eliminated and the generation of plating debris caused by the thread engagement can be suppressed. Furthermore, two components, that is, the nut 125 and the belleville spring 124, for pressing the stacked components ranging from the lower insulating plate to the weight, can be replaced with one component, that is, the stopper ring. As a result, the number of components can be reduced.

However, in the knocking sensor described in Patent Document 2, there is a problem in that it is difficult to maintain insulation between the metal shell and the lower electrode plate 11 and insulation between the metal shell and the upper electrode plate. The insulation between the metal shell and the lower electrode plate and the insulation between the metal shell and the upper electrode plate are securely maintained in the case that the resin constituting the resin molded body is filled in the cylindrical space between the metal shell and the stacked components ranging from the lower insulating plate to the weight through a flow passage provided in the weight.

However, in the case that the groove section is provided in the metal shell and the stopper ring is crimped onto the groove section so as to be fixed to the cylindrical section, the metal shell and the stopper ring remaining in close contact with each other because the stopper ring is hardly deformed. In that case, the resin substantially flows only through the clearance between the insulating plates and the weight. As a result, the cylindrical space between the metal shell and the stacked components ranging from the lower insulating plate to the weight is hardly filled with the resin, whereby a problem arises in that it is difficult to maintain the insulation between the metal shell and the lower insulating plate and the insulation between the metal shell and the upper insulating plate.

SUMMARY OF THE INVENTION

In order to solve the above-mentioned problems, an object of the present invention is to provide a non-resonant knocking sensor capable of suppressing a lowering of internal insulation performance and capable of reducing production cost, and to provide a method for producing the non-resonant knocking sensor.

The above object of the invention has been achieved by providing, in a first aspect of the invention, a non-resonant knocking sensor comprising: a sensor body including: a metal shell including a shell-side cylindrical section formed into a cylindrical shape and a shell-side flange section extending radially outward from one end section of the shell-side cylindrical section, a piezoelectric element having a through hole into which the shell-side cylindrical section is inserted, a weight having a through hole into which the shell-side cylindrical section is inserted and being disposed so that the piezoelectric element is held between the weight and the shell-side flange section, and a fixing portion for fixing the weight by pressing the weight toward the shell-side flange section; and a resin molded body for covering the sensor body with resin, wherein the fixing portion has a fixing-side cylindrical section into which the shell-side cylindrical section is inserted and at least portions of which are pressed toward an outer circumferential surface of the shell-side cylindrical section so as to be crimped, and a fixing-side flange section, extending from the end section of the fixing-side cylindrical section on the side of the weight, for pressing the weight toward the shell-side flange section, wherein the fixing-side cylindrical section includes crimped portions to be radially inwardly crimped and spaced-apart portions which are spaced apart from the shell-side cylindrical section at a plurality of spaced part portions spaced apart in the circumferential direction, and wherein a space between the outer circumferential surface of the shell-side cylindrical section and inner circumferential surfaces of the spaced-apart portions are filled with the resin.

In a preferred embodiment (2) of the non-resonant knocking sensor (1) of the invention, the fixing portion and the weight are disposed nearly coaxially, and a thickness t of the fixing-side cylindrical section and a distance d from the inner circumferential surface of the weight to the outer circumferential surface of the shell-side cylindrical section satisfy a relationship of $d>t$.

In yet another preferred embodiment (3) of the non-resonant knocking sensor (1) or (2) of the invention, the sensor body includes an upper insulating plate having a through hole through which the shell-side cylindrical section passes, a lower insulating plate having a through hole through which the shell-side cylindrical section passes, an upper electrode plate having a through hole through which the shell-side cylindrical section passes, and a lower electrode plate having a through hole through which the shell-side cylindrical section passes, a stacked body is formed by stacking the lower insulating plate, the lower electrode plate, the piezoelectric element, the upper electrode plate and the upper insulating plate in this order, the fixing portion and the stacked body are disposed coaxially, and the thickness t of the fixing-side cylindrical section and a distance f between an inner circumferential surface of the stacked body and the outer circumferential surface of the shell-side cylindrical section satisfy a relationship of $f>t$.

In yet another preferred embodiment (4) of the non-resonant knocking sensor (1) (2) or (3) of the invention, the area of the outer circumferential surface of the shell-side cylindrical section facing the fixing-side cylindrical section is formed into a surface having a cylindrical shape.

In a second aspect (4), the present invention provides method for producing a non-resonant knocking sensor equipped with: a sensor body including: a metal shell including a shell-side cylindrical section formed into a cylindrical shape and a shell-side flange section extending radially outward from one end section of the shell-side cylindrical section, a piezoelectric element having a through hole into which the shell-side cylindrical section is inserted, a weight having a through hole into which the shell-side cylindrical section is inserted and being disposed so that the piezoelectric element is held between the weight and the shell-side flange section, and a fixing portion having a fixing-side cylindrical section into which the shell-side cylindrical section is inserted and which is pressed toward the outer circumferential surface of the shell-side cylindrical section and fixed thereto, and a fixing-side flange section extending radially outward from the end section of the fixing-side cylindrical section on the side of the weight; and a resin molded body, made of a resin, for covering the sensor body, the method comprising the steps of: forming the area of the outer circumferential surface of the shell-side cylindrical section of the metal shell facing the fixing-side cylindrical section into a surface having a cylindrical shape, selecting a weight having a desired thickness from among a plurality of weights having different thicknesses, and stacking the piezoelectric element and the weight in this order from the side of the shell-side flange section, stacking the fixing-side flange section on the weight while being disposed on the side of the weight, and swaging at least portions of the fixing-side cylindrical section at a plurality of spaced apart portions being spaced apart in the circumferential direction so that the fixing portion is fixed to the metal shell, enclosing the sensor body with an injection mold and injecting a liquid resin into an interior of the injection mold to form the resin molded body.

With the non-resonant knocking sensor according to the present invention, the fixing portion is fixed to the metal shell by pressing the weight toward the shell-side flange section using the fixing-side flange section of the fixing portion and by pressing at least portions of the fixing-side cylindrical section toward the outer circumferential surface of the shell-side cylindrical section so as to be crimped. Hence, the stacked components can be pressed toward the shell-side flange section using only the fixing portion, whereby the number of components can be reduced in comparison with the knocking sensor described in Patent Document 1. Furthermore, it is not necessary to form an externally threaded section on the outer circumferential surface of the shell-side cylindrical section.

Moreover, the fixing-side cylindrical section is crimped at a plurality of portions being spaced apart in the circumferential direction, whereby the fixing-side cylindrical section does not make close contact with the shell-side cylindrical section at the spaced apart portions, i.e., portions other than the crimped portions of the fixing-side cylindrical section pressed toward the shell-side cylindrical section formed into a cylindrical shape. Hence, the distance from the inner circumferential surfaces of the spaced apart portions to the outer circumferential surface of the shell-side cylindrical section can be made larger than the distance in the state before the swaging. In other words, partial spaces can be obtained securely between the fixing-side cylindrical section and the shell-side cylindrical section by performing the swaging so that the cross-sectional shape of the fixing-side cylindrical section originally having a cylindrical shape is deformed positively. Hence, the spaces between the fixing-side cylindrical section and the shell-side cylindrical section can be used as flow passages in the space between the metal shell and the piezoelectric element to allow the resin for forming the resin molded body to flow, and the resin is eventually filled in the flow passages. Consequently, unlike the case of the knocking sensor described in Patent Document 2, the resin enters not only through the spaces provided in the weight but also through the flow passages. For this reason, the cylindrical space between the metal shell and the stacked components ranging from the lower insulating plate to the weight is easily filled with the resin, whereby it is possible to suppress lowering of the insulating performance inside the knocking sensor.

Furthermore, it is desirable that the swaging is performed radially inward at a plurality of portions spaced apart in the circumferential direction at equal intervals. In this case, the fixing portion can be fixed to the metal shell more stably in comparison with a case in which the swaging is performed at portions spaced apart at irregular intervals. Moreover, the resin is easily allowed to flow into the above-mentioned cylindrical space more uniformly.

In the above-mentioned invention, it is desirable that the fixing portion and the weight should be disposed nearly coaxially and that the thickness t of the fixing-side cylindrical section and the distance d from the inner circumferential surface of the weight to the outer circumferential surface of the shell-side cylindrical section should satisfy the relationship of d>t.

As described above, the thickness t of the fixing-side cylindrical section is made less than the distance d from the inner circumferential surface of the weight to the outer circumferential surface of the shell-side cylindrical section, whereby the fixing-side cylindrical section can be deformed easily, and at least portions of the inner circumferential surface of the fixing-side cylindrical section can be deformed and pressed easily toward the outer circumferential surface of the shell-side cylindrical section, in other words, can be crimped easily. As a result, the fixing portion can be fixed to the metal shell stably. Furthermore, since the fixing-side cylindrical section is deformed easily, the spaces between the outer circumferential surface of the shell-side cylindrical section and the inner circumferential surfaces of the spaced apart portions can be made larger, whereby the flow passages for allowing the resin to flow can be formed larger. As a result, the cylindrical space between the metal shell and the stacked components ranging from the insulating plate to the weight is easily filled with the resin constituting the resin molded body, whereby it is possible to suppress lowering of the insulating performance inside the knocking sensor. The thickness t of the fixing-side cylindrical section herein indicates the maximum thickness in the state before the swaging.

In the above-mentioned invention, the sensor body is further equipped with an upper insulating plate and a lower electrode plate, each having a through hole into which the shell-side cylindrical section is inserted, and an upper electrode plate and a lower electrode plate, each having a through hole into which the shell-side cylindrical section is inserted. The lower insulating plate, the lower electrode plate, the piezoelectric element, the upper electrode plate, and the upper insulating plate are stacked in this order to form a stacked body. It is desirable that the fixing portion and the stacked body should be disposed nearly coaxially and that the thickness t of the fixing-side cylindrical section and the distance f between the inner circumferential surface of the stacked body and the outer circumferential surface of the shell-side cylindrical section should satisfy the relationship of f>t.

As described above, the thickness t of the fixing-side cylindrical section is made less than the distance f from the inner circumferential surface of the stacked body to the outer circumferential surface of the shell-side cylindrical section, whereby the fixing-side cylindrical section can be deformed easily, and at least portions of the inner circumferential surface of the fixing-side cylindrical section can be deformed and pressed easily toward the outer circumferential surface of the shell-side cylindrical section, in other words, can be crimped easily. As a result, the fixing portion can be fixed to the metal shell stably. Furthermore, since the fixing-side cylindrical section is deformed easily, the spaces between the outer circumferential surface of the shell-side cylindrical section and the inner circumferential surfaces of the spaced apart portions can be made larger, whereby the flow passages for allowing the resin to flow can be formed larger. As a result, the cylindrical space between the stacked body and the metal shell is easily filled with the resin constituting the resin molded body, whereby the insulation between the metal shell and the lower electrode plate and the insulation between the metal shell and the upper electrode plate are obtained more securely.

In the above-mentioned invention, it is desirable that the area of the outer circumferential surface of the shell-side cylindrical section facing the fixing-side cylindrical section should be formed into a surface having a cylindrical shape.

As described above, since the outer circumferential surface of the shell-side cylindrical section facing the fixing-side cylindrical section is formed into a surface having a cylindrical shape, the fixing portion can be crimped onto the metal shell easily even if the thickness of the weight is changed. In other words, even if a weight having a desired thickness is selected from among a plurality of weights having different thicknesses and the selected weight is used for the non-resonant knocking sensor, the metal shell and the fixing portion are not required to be changed. For example, in the case that a groove for swaging is provided on the outer circumferential surface of the shell-side cylindrical section of the metal shell as in the knocking sensor described in Patent Document 2, the thickness of the weight can be changed only in the range from this groove to the area of the fixing-side cylindrical section facing the groove. As a result, the selection range of the thickness of the weight is narrowed.

Changing the thickness of the weight is meaningful in that the voltage of the detection signal output from the knocking sensor can be adjusted in a desired range. In other words, the mass of the weight is adjusted by changing the thickness of the weight, and the force applied from the weight due to knocking to press the piezoelectric element is increased or decreased, whereby the voltage range of the detection signal output from the piezoelectric element is adjusted. More specifically, when the mass of the weight is increased, the voltage range of the detection signal output from the knocking sensor becomes larger; when the mass of the weight is decreased, the voltage range of the detection signal becomes smaller.

The outer circumferential surface of the shell-side cylindrical section being formed into a surface having a cylindrical shape herein means that when the fixing-side cylindrical section is cut along the plane including the axial line of the shell-side cylindrical section, the sectional shape of the outer circumferential surface of the shell-side cylindrical section becomes straight, or irregularities larger than irregularities generated when the fixing-side cylindrical section is processed by cutting or the like are not present on the outer circumferential surface.

In the method for producing the non-resonant knocking sensor according to the present invention, the outer circumferential surface of the shell-side cylindrical section facing the fixing-side cylindrical section is formed into a surface having a cylindrical shape in the forming process, whereby a weight having a desired thickness can be selected from among a plurality of weights having different thicknesses and the selected weight can be used in the stacking process.

Furthermore, in the swaging process, the fixing-side cylindrical section is crimped onto the shell-side cylindrical section formed into a cylindrical shape at a plurality of portions being spaced apart in the circumferential direction of the fixing-side cylindrical section, whereby the fixing portion can be fixed to the metal shell stably, and spaces can be formed between the fixing-side cylindrical section and the shell-side cylindrical section. Hence, in the following injection process, the resin for forming the resin molded body can be allowed to flow through the spaces. Moreover, it is desirable that the fixing-side cylindrical section is crimped onto the shell-side cylindrical section at a plurality of portions being spaced apart in the circumferential direction of the fixing-side cylindrical section at equal intervals. In this case, the fixing portion can be fixed to the metal shell more stably and the resin for insulation use is allowed to flow into the spaces more uniformly.

Advantages of the Invention

In the non-resonant knocking sensor according to the present invention, the fixing portion is fixed to the metal shell by pressing at least portions of the fixing-side cylindrical section toward the outer circumferential surface of the shell-side cylindrical section formed into a cylindrical shape, whereby the plated layer provided on the metal shell is suppressed from being peeled off, and the resin for insulation use is allowed to easily flow into spaces, such as the space between the metal shell and the electrode plate on the side of the weight, through the spaces, formed by the swaging and fixing, between the outer circumferential surface of the shell-side cylindrical section and the inner circumferential surfaces of the spaced apart portions of the fixing-side cylindrical section. As a result, the knocking sensor is effective in that lowering of the insulation performance inside the knocking sensor can be suppressed. In addition, since the stacked components can be pressed toward the shell-side flange section and can be fixed thereto by using only the fixing portion, the knocking sensor is effective in that the production cost can be reduced.

In the method for producing the non-resonant knocking sensor according to the present invention, the fixing-side cylindrical section is crimped onto the shell-side cylindrical section at a plurality of portions spaced apart in the circumferential direction of the fixing-side cylindrical section, whereby the plated layer provided on the metal shell is suppressed from being peeled off, and a resin for insulation use is allowed to flow easily and uniformly into spaces, such as the space between the metal shell and the piezoelectric element, through the spaces, formed by the swaging and fixing, between the fixing-side cylindrical section and the shell-side cylindrical section. As a result, the knocking sensor is effective in that lowering of the insulation performance inside the knocking sensor can be suppressed. In addition, since the stacked components can be pressed toward the shell-side flange section and can be fixed thereto by using only the fixing portion, the knocking sensor is effective in that the production cost can be reduced.

DESCRIPTION OF EXEMPLARY EMBODIMENTS

Figure 1:
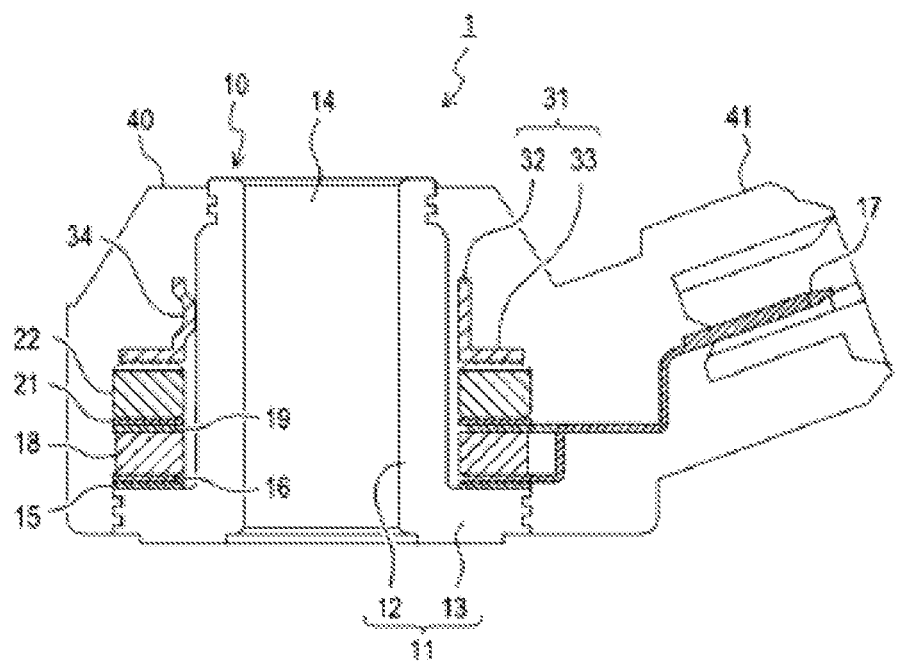
FIG. 1 is a cross-sectional view illustrating the configuration of a knocking sensor according to an embodiment of the present invention.

A knocking sensor 1 according to an embodiment of the present invention will be described referring to FIGS. 1 to 5. However, the present invention should not be construed as being limited thereto. FIG. 1 is a cross-sectional view illustrating the configuration of a knocking sensor 1 according to the embodiment, and FIG. 2 is an exploded view illustrating the configuration of the sensor body 10 shown in FIG. 1.

The knocking sensor (a non-resonant knocking sensor) 1 according to the embodiment is used to detect the occurrence of knocking in an internal combustion engine and is a so-called center-hole-type non-resonant knocking sensor in which an installation hole 14 for installation in the cylinder block of an internal combustion engine is provided at the central area thereof as shown in FIG. 1.

The knocking sensor 1 is configured by covering the sensor body 10 detailed below with a resin molded body 40 and is formed into a cylindrical shape having a short length as a whole. Furthermore, a connector section 41 is formed so as to protrude radially outward from part of the outer circumferential surface of the knocking sensor 1 formed into a cylindrical shape. A first terminal 17 and a second terminal 20 respectively extending from a lower electrode plate 16 and an upper electrode plate 19 are disposed inside the connector section 41 (only the first terminal 17 is shown in FIG. 1). The connector section 41 is designed so as to be connected to an external connector, not shown.

Figure 2:
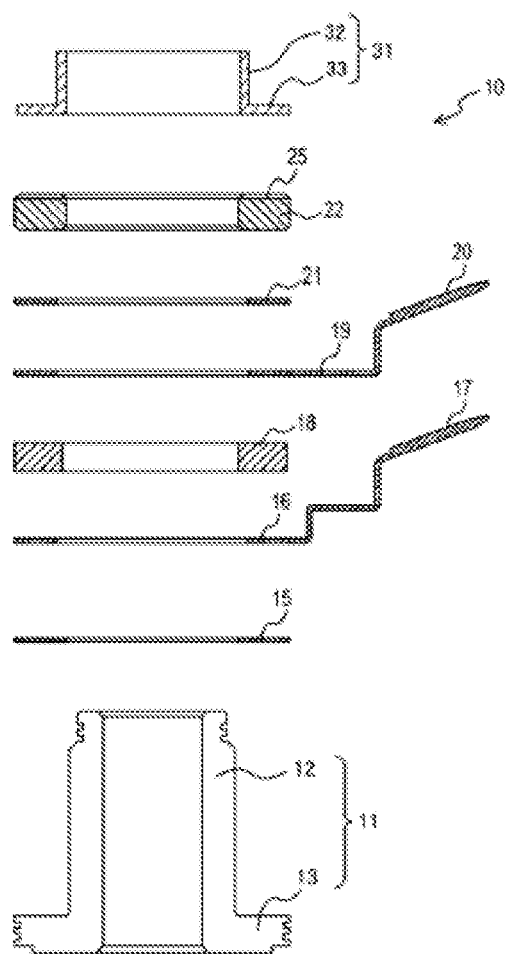
FIG. 2 is an exploded view illustrating the configuration of the sensor body shown in FIG. 1.

Moreover, as shown in the exploded view of FIG. 2, the knocking sensor 1 mainly has a metal shell 11; and a lower insulating plate 15, a lower electrode plate 16, a piezoelectric element 18, an upper electrode plate 19, an upper insulating plate 21, a weight 22, and a fixing portion 31, each formed into an annular shape. Through holes into which a shell-side cylindrical section 12 is inserted are formed at the central areas of the lower insulating plate 15, the lower electrode plate 16, the piezoelectric element 18, the upper electrode plate 19, the upper insulating plate 21, the weight 22, and the fixing portion 31. The lower insulating plate 15, the lower electrode plate 16, the piezoelectric element 18, the upper electrode plate 19, the upper insulating plate 21, the weight 22, and the fixing portion 31 are stacked around the outer circumference of the shell-side cylindrical section 12 in this order from the side of a shell-side flange section 13. The lower insulating plate 15 disposed closest to the shell-side flange section 13 is directly placed on the shell-side flange section 13.

In this application, the lower insulating plate 15, the lower electrode plate 16, the piezoelectric element 18, the upper electrode plate 19, and the upper insulating plate 21 are referred to as a stacked body for the sake of convenience.

The metal shell 11 is a member formed of a metal material (for example, SWCH or SPHD) and is plated to improve its corrosion resistance. The metal shell 11 is provided with the shell-side cylindrical section 12 which has a cylindrical shape and in which the installation hole 14 for allowing a bolt to be inserted is formed, and is also provided with the shell-side flange section 13 having an annular shape and extending radially outward from the lower end of the shell-side cylindrical section 12. The inner circumferential surface of the shell-side cylindrical section 12 is a surface formed into a cylindrical shape or a curved shape and not provided with groove sections dented radially or protruding sections extending radially. In other words, the inner circumferential surface is a surface that appears as a straight line when the shell-side cylindrical section 12 is viewed in the vertical cross-section cut along the surface containing the axial line thereof.

The lower insulating plate 15 and the upper insulating plate 21 are formed of a film-like synthetic resin (for example, polyethylene terephthalate: PET) having insulation performance and are disc-like members in each of which a through hole is formed to allow the shell-side cylindrical section 12 to be inserted. The lower insulating plate 15 provides insulation between the shell-side flange section 13 and the lower electrode plate 16, and the upper insulating plate 21 provides insulation between the upper electrode plate 19 and the weight 22. The lower insulating plate 15 and the upper insulating plate 21 may be formed of a resin, such as PET, polyphenylene sulfide (PPS), polytetrafluoroethylene (PTFE), polyether sulfone (PES) or polyether ether ketone (PEEK), with no particular limitation.

The lower electrode plate 16 and the upper electrode plate 19 are formed of a conductive material (for example, brass). The electrode plates have disc-like portions in each of which a through hole is formed to allow the shell-side cylindrical section 12 to be inserted and also have the first terminal 17 and the second terminal 20 respectively extending from the disc-like portions. The disc-like portion of the lower electrode plate 16 makes contact with the surface of the piezoelectric element 18 on the side of the shell-side flange section 13 so that electrical contact can be established therebetween, and the disc-like portion of the upper electrode plate 19 makes contact with the surface of the piezoelectric element 18 on the side of the weight 22 so that electrical contact can be established therebetween.

The piezoelectric element 18 is an element formed of piezoceramics (for example, PZT). The element generates a voltage when subjected to a pressing force, and the magnitude of the generated voltage changes depending on the magnitude of the pressing force.

Figure 3A:
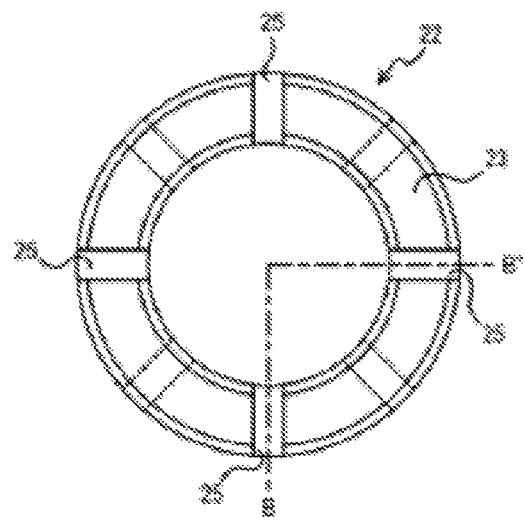
FIGS. 3A to 3C are views illustrating the configuration of the weight shown in FIG. 1.
Figure 3B:
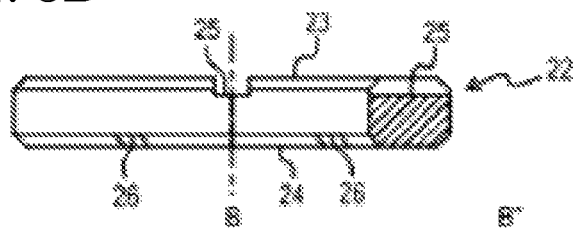
Figure 3C:
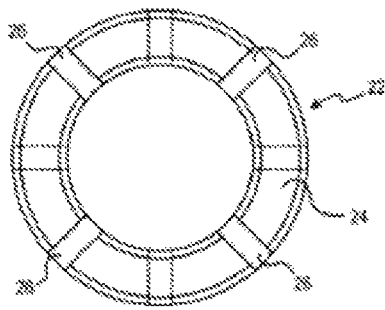

FIGS. 3A to 3B are views illustrating the configuration of the weight 22 shown in FIG. 1. FIG. 3A is a top view of the weight 22, FIG. 3B is a front view of the weight 22, taken on line B-B" of FIG. 3A, and FIG. 3C is a bottom view of the weight 22. In FIG. 3B, the right-half of the weight 22 is shown as a portion cross-sectioned along line B-B", and the left-half thereof is shown as a portion not cross-sectioned.

The weight 22 is formed of a metal material (for example, 50H470) having a specific gravity being effective as a weight. As shown in FIGS. 3A to 3C, the weight 22 is an annular member or a cylindrical member being low in height in the axial direction in which a through hole into which the shell-side cylindrical section 12 is inserted is formed. Chamfering is performed at the boundaries between the outer circumferential surface and the upper surface 23 of the weight 22 and between the outer circumferential surface and the lower surface 24 thereof and at the boundaries between the inner circumferential surface and the upper surface 23 thereof and between the inner circumferential surface and the lower surface 24 thereof. The surface of the weight 22 facing the shell-side flange section 13 is the lower surface 24, and the surface thereof on the opposite side of the lower surface 24 is the upper surface 23.

As shown in FIG. 3A, four upper notches 25 dented from the upper surface 23 to the lower surface 24 are provided on the upper surface 23 of the weight 22. The upper notches 25 are grooves extending in the radial direction of the weight 22 and are disposed in the circumferential direction at equal intervals, in other words, disposed in the circumferential direction at intervals of 90°. In addition, as shown in FIG. 3C, four lower notches 26 dented from the lower surface 24 to the upper surface 23 are provided on the lower surface 24 of the weight 22. The lower notches 26 are grooves extending in the radial direction of the weight 22 and are disposed in the circumferential direction at equal intervals, in other words, disposed in the circumferential direction at intervals of 90°, as in the case of the upper notches 25.

The upper notches 25 and the lower notches 26 are disposed alternately in the circumferential direction when the weight 22 is viewed from the top or from the bottom. In this embodiment, an example in which the upper notches 25 and the lower notches 26 are alternately disposed in the circumferential direction at intervals of 45° is described. Furthermore, an example in which the total of the groove depth of the upper notch 25 and the groove depth of the lower notch 26 is smaller than the thickness from the upper surface 23 to the lower surface 24 is described.

Besides, although an example in which the four upper notches 25 are provided on the upper surface 23 of the weight 22 and the four lower notches 26 are provided on the lower surface 24 thereof has been described in this embodiment, the numbers of the upper notches 25 and the lower notches 26 may be four or more or four or less. Moreover, either or none of the upper notches 25 or the lower notches 26 may be provided for the weight 22, with no particular limitation.

As described below, an insulating resin can be allowed to flow into the space between the metal shell and the stacked components through the upper notches 25 provided on the upper surface 23 of the weight 22 and the lower notches 26 provided on the lower surface 24 of the weight 22. However, since the mass of the weight 22 becomes lighter by the amount corresponding to the increased occupation ratio of the notches, there is a disadvantage in that the voltage range of the detection signal output from the knocking sensor is reduced. Hence, it is desirable that the notches are not provided for the weight 22 from the viewpoint of performance of the knocking sensor.

The fixing portion 31 is formed of a plate-like member made of metal and is used as a member for pressing the lower insulating plate 15, the lower electrode plate 16, the piezoelectric element 18, the upper electrode plate 19, the upper insulating plate 21, and the weight 22 toward the shell-side flange section 13 to fix the components thereto. The fixing portion 31 is mainly provided with a fixing-side cylindrical section 32 and a fixing-side flange section 33. The fixing-side cylindrical section 32 is a cylindrical member in which a through hole into which the shell-side cylindrical section 12 is inserted is formed. The fixing-side flange section 33 is a disc-like member extending radially outward from the end section of the fixing-side cylindrical section 32 on the side of the shell-side flange section 13.

Figure 4:
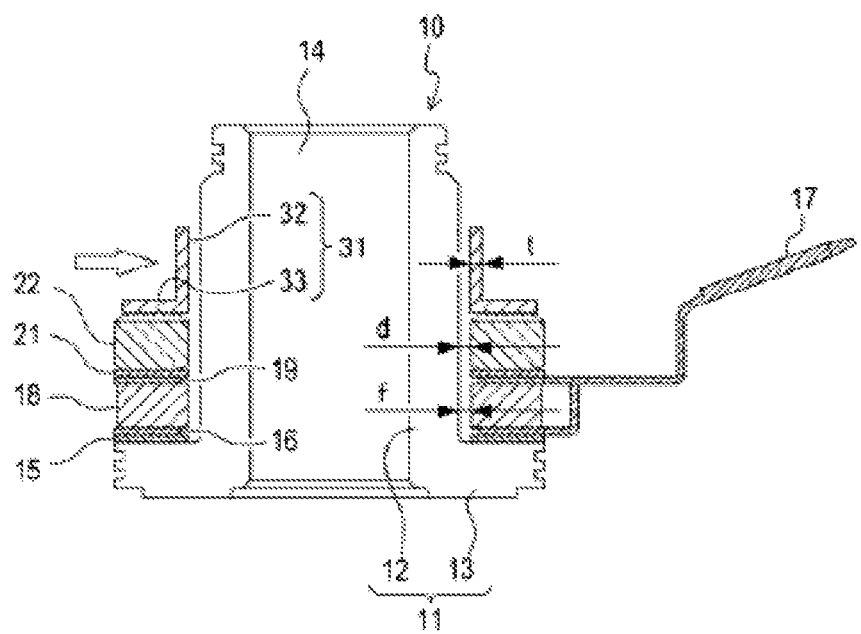
FIG. 4 is a cross-sectional view illustrating a state in which a fixing portion and other sections are sacked on the metal shell of the sensor body.

FIG. 4 is a cross-sectional view illustrating a state in which the lower insulating plate 15, the lower electrode plate 16, the piezoelectric element 18, the upper electrode plate 19, the upper insulating plate 21, the weight 22, and the fixing portion 31 are stacked on the metal shell 11.

As shown in FIG. 4, the thickness t of the plate-like member constituting the fixing portion 31 has a thickness satisfying the relationship of $d>t$ where d is the distance from the outer circumferential surface of the shell-side cylindrical section 12 to the inner circumferential surface of the weight 22. Furthermore, the thickness t is a thickness satisfying the relationship of $f>t$ where the distance from the outer circumferential surface of the shell-side cylindrical section 12 to the inner circumferential surface of the stacked body is f. The thicknesses t of both the fixing-side cylindrical section 32 and the fixing-side flange section 33 constituting the fixing portion 31 may satisfy the above-mentioned relationships, or only the thickness t of the fixing-side cylindrical section 32 may satisfy the above-mentioned relationships, with no particular limitation. Moreover, in the case that the inner circumferential surfaces of the stacked components are not flush with one another, the distance between the outer circumferential surface of the shell-side cylindrical section 12 and the inner circumferential surface of the stacked component being located closest to the outer circumferential surface of the shell-side cylindrical section 12 is determined as f.

Figure 5A:
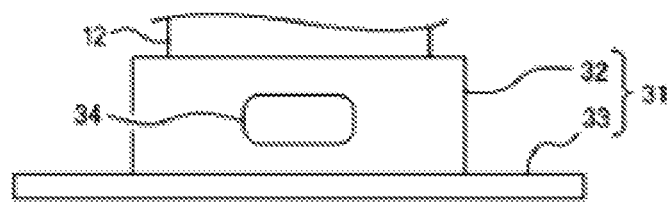
FIGS. 5A and 5B are views illustrating a state in which the fixing portion shown in FIG. 1 is crimped onto the metal shell.
Figure 5B:
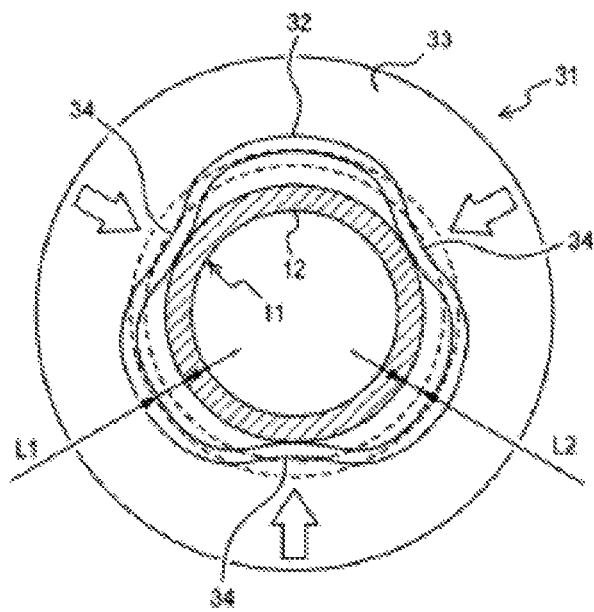
Figure 6:
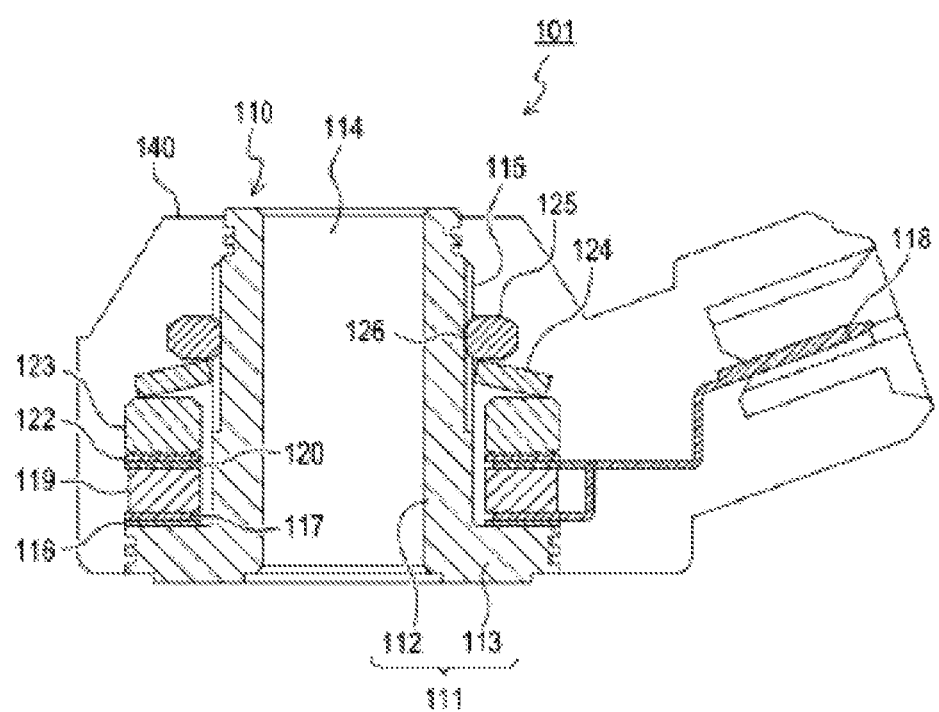
FIG. 6 is a cross-sectional view illustrating the configuration of a conventional knocking sensor along the axial direction thereof.
Figure 7:
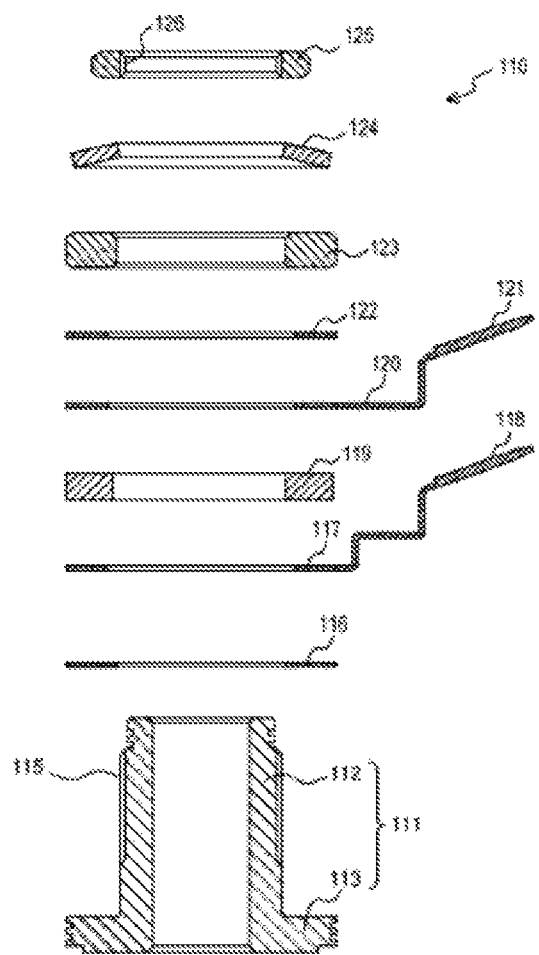
FIG. 7 is an exploded view illustrating the configuration of the sensor body shown in FIG. 6.

FIGS. 5A and 5B are views illustrating a state in which the fixing portion 31 shown in FIG. 1 is crimped onto the metal shell 11. FIG. 5A is a front view showing the fixing portion 31 being crimped. FIG. 5B is a top view illustrating the crimped positions of the fixing portion 31 and illustrating spaces formed between the fixing portion 31 and the metal shell 11.

On the outer circumferential surface of the fixing-side cylindrical section 32 of the fixing portion 31, crimped portions 34 in which the inner circumferential surface of the fixing-side cylindrical section 32 is pressed toward the outer circumferential surface of the shell-side cylindrical section 12 are formed as shown in FIGS. 5A and 5B. The crimped portions 34 are formed in the circumferential direction of the fixing-side cylindrical section 32 at equal intervals, in other words, formed at three positions at intervals of 120°. In addition, at a position between the adjacent crimped portions, the distance L1 between the inner circumferential surface (indicated by a solid line in FIG. 5B) of the fixing-side cylindrical section 32 and the outer circumferential surface of the shell-side cylindrical section 12 is made larger than the distance L2 between the inner circumferential surface (indicated by a broken line in FIG. 5B) of the fixing-side cylindrical section 32 in the state before the swaging and the outer circumferential surface of the shell-side cylindrical section 12. The crimped portions 34 should only be provided at a plurality of portions spaced apart in the circumferential direction. Furthermore, it is desirable that resistance welding should be performed for the crimped portions 34 after the swaging to further enhance the fixing forces at the crimped portions 34. A portion of the fixing-side cylindrical section 32 between the adjacent crimped portions 34 described herein corresponds to the "spaced apart portion" of the invention. Accordingly, since the crimped portions 34 are formed in the circumferential direction of the fixing-side cylindrical section 32 at equal intervals and at three positions, the spaced apart portions being spaced apart from the shell-side cylindrical section 12 are also formed in the circumferential direction of the fixing-side cylindrical section 32 at equal intervals and at three positions. Similarly, the spaces between the inner circumferential surfaces of the spaced apart portions and the outer circumferential surface of the shell-side cylindrical section 12 are also formed in the circumferential direction of the fixing-side cylindrical section 32 at equal intervals and at three positions.

As shown in FIG. 1, a cylindrical space is formed between the outer circumferential surface of the shell-side cylindrical section 12 and the inner circumferential surfaces of the lower insulating plate 15, the lower electrode plate 16, the piezoelectric element 18, the upper electrode plate 19, and the upper insulating plate 21. The resin constituting the resin molded body 40 described below is allowed to flow into the space. In other words, a cylindrical space is formed between the outer circumferential surface of the shell-side cylindrical section 12 and the inner circumferential surface of the stacked body, and the resin constituting the resin molded body 40 described below is allowed to flow into the space. The resin passes through flow passages formed by the upper insulating plate 21 and the lower notches 26 and extending in the radial direction, through flow passages formed by the fixing-side flange section 33 and the upper notches 25 and extending in the radial direction, and through a flow passage formed between the fixing-side cylindrical section 32 and the shell-side cylindrical section 12 and extending in the axial direction, and then flows into the above-mentioned cylindrical space. In other words, a cylindrical space is formed between the outer circumferential surface of the shell-side cylindrical section 12 and the inner circumferential surfaces of the stacked body and the fixing portion, and the resin constituting the resin molded body 40 described below is filled in the space. The resin prevents the lower electrode plate 16, the piezoelectric element 18 and the upper electrode plate 19 from electrically connecting to (making contact with) the shell-side cylindrical section 12.

The resin molded body 40 is used to cover the sensor body 10 with a resin, such as nylon 66 (PA 66) and has the connector section 41 protruding radially outward. Although an example in which the resin molded body 40 is formed of PA 66 is described in this embodiment, the resin molded body 40 may be formed of other resins, such as PPS, with no particular limitation.

Next, a method for producing the knocking sensor 1 having the above-mentioned configuration will be described below.

In the knocking sensor 1 according to this embodiment, when the metal shell 11 is formed, at least the outer circumferential surface of the shell-side cylindrical section 12 facing the fixing portion 31, more specifically, at least the area of the outer circumferential surface facing the fixing-side cylindrical section 32 is formed as a cylindrical surface (a forming process). As a method for forming the outer circumferential surface of the shell-side cylindrical section 12 of the metal shell 11 into a surface having a cylindrical shape, it is possible to use known forming methods, for example, machining, such as cutting, and sintering.

Then, as shown in FIG. 4, the lower insulating plate 15, the lower electrode plate 16, the piezoelectric element 18, the upper electrode plate 19, the upper insulating plate 21, and the weight 22 are stacked nearly coaxially in this order on the side of the shell-side flange section 13 of the metal shell 11 (a stacking process). The fixing portion 31 is disposed on the weight 22 so that the fixing-side flange section 33 is placed on the side of the weight 22.

A pressing force for pressing the weight 22 toward the shell-side flange section 13 is applied to the fixing portion 31, and the portions of the fixing-side cylindrical section 32 corresponding to the crimped portions 34 are pressed so as to be deformed, whereby swaging in which the inner circumferential surface of the fixing-side cylindrical section 32 is pressed toward the outer circumferential surface of the shell-side cylindrical section 12 is performed as shown in FIGS. 5A and 5B (a swaging process). The crimped portions 34 being dent by the pressing are formed at the pressed portions of the fixing-side cylindrical section 32. The hollow arrows shown in FIGS. 4 and 5B indicate positions and directions in which the pressing force is applied when the swaging is performed.

The cross-sectional shape of the fixing-side cylindrical section 32 is deformed from the circular shape indicated by the broken lines shown in FIG. 5B to the shape indicated by the solid lines shown therein by performing the swaging for the fixing-side cylindrical section 32. In other words, at a portion between the adjacent crimped portions, the distance L1 between the inner circumferential surface of the fixing-side cylindrical section 32 and the outer circumferential surface of the shell-side cylindrical section 12 after the swaging is made larger than the distance L2 before the swaging.

After the fixing portion 31 is fixed to the metal shell 11 by the swaging and the sensor body 10 is completed, the resin molded body 40 for covering the sensor body 10 is formed. More specifically, the sensor body 10 is enclosed with an injection mold (not shown), the interior of which is formed into the outer shape of the knocking sensor 1, and a liquid resin (PA 66 in this embodiment) is injected into the injection mold (an injection process).

At this time, the injected resin covers the circumference of the sensor body 10 and flows into the cylindrical space between the outer circumferential surface of the shell-side cylindrical section 12 and the inner circumferential surfaces of the lower insulating plate 15, the lower electrode plate 16, the piezoelectric element 18, the upper electrode plate 19, the upper insulating plate 21, and the fixing-side cylindrical section 32. More specifically, the injected resin flows radially inward into the above-mentioned cylindrical space via the flow passages formed by the lower notches 26 of the weight 22 and the upper insulating plate 21 and by the upper notches 25 of the weight 22 and the fixing-side flange section 33. Furthermore, the injected resin also flows in the axial direction via the flow passage formed between the outer circumferential surface of the shell-side cylindrical section 12 and the inner circumferential surface of the fixing-side cylindrical section 32 and then flows into the above-mentioned cylindrical space.

Then, the injected resin is cured to form the resin molded body 40, and the resin molded body 40, that is, the knocking sensor 1, is extracted from the above-mentioned injection mold. As a result, the processing for producing the knocking sensor 1 is completed.

With the above-mentioned configuration, the fixing portion 31 can be fixed to the metal shell 11 by pressing the weight 22 toward the shell-side flange section 13 using the fixing-side flange section 33 of the fixing portion 31 and by pressing the crimped portions 34 of the fixing-side cylindrical section 32 toward the outer circumferential surface of the shell-side cylindrical section 12. Hence, the stacked components can be pressed toward the shell-side flange section 13 using only the fixing portion 31, whereby the number of components can be reduced in comparison with the knocking sensor described in Patent Document 1. Furthermore, it is not necessary to form an externally threaded section on the outer circumferential surface of the shell-side cylindrical section 12, whereby the production costs for the metal shell 11 and the knocking sensor 1 can be reduced.

Besides, it is not necessary to threadedly engage an externally threaded section with an internally threaded section, whereby it is possible to reduce the possibility of causing the plated layer provided on the surface of the metal shell 11 to peel off Moreover, the fixing-side cylindrical section 32 is crimped at a plurality of portions being spaced apart in the circumferential direction, whereby the fixing-side cylindrical section 32 does not make close contact with the shell-side cylindrical section 12 at the spaced apart portions, i.e., portions other than the crimped portions 34 of the fixing-side cylindrical section 32 pressed toward the shell-side cylindrical section 12. Hence, the distance from the inner circumferential surfaces of the spaced apart portions of the fixing-side cylindrical section 32 to the outer circumferential surface of the shell-side cylindrical section 12 can be made larger than the distance in the state before the swaging. In other words, partial spaces can be obtained securely between the fixing-side cylindrical section 32 and the shell-side cylindrical section 12 by performing the swaging so that the cross-sectional shape of the fixing-side cylindrical section 32 originally having a circular shape is positively deformed. Hence, the spaces between the fixing-side cylindrical section 32 and the shell-side cylindrical section 12 can be used as flow passages to allow the resin for forming the resin molded body 40 to flow, and the resin is eventually filled in the flow passages. Consequently, unlike the case of the knocking sensor described in Patent Document 2, the resin enters not only through the spaces provided in the weight 22 but also through the flow passages. For this reason, the cylindrical space between the metal shell 11 and the stacked components ranging from the lower insulating plate 15 to the weight 22 is easily filled with the resin, whereby it is possible to suppress lowering of the insulating performance inside the knocking sensor 1.

Furthermore, it is desirable that the swaging is performed radially inward at a plurality of portions spaced apart in the circumferential direction at equal intervals. In this case, the fixing portion 31 can be fixed to the metal shell 11 more stably in comparison with a case in which the swaging is performed at portions spaced apart at irregular intervals. Moreover, the resin is easily allowed to flow into the above-mentioned cylindrical space more uniformly.

In addition, the thickness t of the fixing-side cylindrical section 32 is made less than the distance d from the inner circumferential surface of the weight 22 to the outer circumferential surface of the shell-side cylindrical section 12, whereby the fixing-side cylindrical section 32 can be deformed easily, and at least portions of the inner circumferential surface of the fixing-side cylindrical section 32 can be deformed and pressed easily toward the outer circumferential surface of the shell-side cylindrical section 12, in other words, can be crimped easily. As a result, the fixing portion 31 can be fixed to the metal shell 11 stably. Furthermore, since the fixing-side cylindrical section 32 is deformed easily, the spaces between the outer circumferential surface of the shell-side cylindrical section 12 and the inner circumferential surfaces of the spaced apart portions of the fixing-side cylindrical section 32 can be made larger, whereby the flow passages for allowing the resin to flow can be formed larger. As a result, the cylindrical space between the shell-side cylindrical section 12 and the stacked components ranging from the lower insulating plate 15 to the weight 22 is easily filled with the resin constituting the resin molded body 40, whereby it is possible to suppress lowering of the insulating performance inside the knocking sensor 1.

Moreover, the thickness t of the fixing-side cylindrical section 32 is made less than the distance f from the inner circumferential surface of the stacked body to the outer circumferential surface of the shell-side cylindrical section 12, whereby the fixing-side cylindrical section 32 can be deformed easily, and at least portions of the inner circumferential surface of the fixing-side cylindrical section 32 can be deformed and pressed easily toward the outer circumferential surface of the shell-side cylindrical section 12, in other words, can be crimped easily. As a result, the fixing portion 31 can be fixed to the metal shell 11 stably. Furthermore, since the fixing-side cylindrical section 32 is deformed easily, the spaces between the outer circumferential surface of the shell-side cylindrical section 12 and the inner circumferential surfaces of the spaced apart portions of the fixing-side cylindrical section 32 can be made larger, whereby the flow passages for allowing the resin to flow can be formed larger. As a result, the cylindrical space between the stacked body and the metal shell 11 is easily filled with the resin constituting the resin molded body 40, whereby the insulation between the metal shell 11 and the lower electrode plate 16 and the insulation between the metal shell 11 and the upper electrode plate 19 are obtained more securely.

Since the outer circumferential surface of the shell-side cylindrical section 12 facing the fixing-side cylindrical section 32 is formed into a surface having a cylindrical shape, the fixing portion 31 can be crimped onto the metal shell 11 easily even if the thickness of the weight 22 is changed. In other words, even if a weight 22 having a desired thickness is selected from among a plurality of weights 22 having different thicknesses and the selected weight 22 is used for the knocking sensor 1 according to this embodiment, the metal shell 11 and the fixing portion 31 are not required to be changed depending on the thickness of the selected weight 22. For example, in the case that a groove for swaging is provided on the outer circumferential surface of the shell-side cylindrical section of the metal shell as in the knocking sensor described in Patent Document 2, the thickness of the weight can be changed only in the range from this groove to the area of the fixing-side cylindrical section facing the groove. As a result, the selection range of the thickness of the weight is narrowed.

Changing the thickness of the weight 22 is meaningful in that the voltage of the detection signal output from the knocking sensor 1 can be adjusted in a desired range. In other words, the mass of the weight 22 is adjusted by changing the thickness of the weight 22, and the force applied from the weight 22 due to knocking vibration to press the piezoelectric element 18 is increased or decreased, whereby the voltage range of the detection signal output from the piezoelectric element 18 is adjusted. More specifically, when the mass of the weight 22 is increased, the voltage range of the detection signal output from the knocking sensor 1 becomes larger; when the mass of the weight 22 is decreased, the voltage range of the detection signal becomes smaller.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based upon and claims the benefit of priority of Japanese Patent Application No. 2011-139498 filed on Jun. 23, 2011 and Japanese Patent Application No. 2012-099544 filed on Apr. 25, 2012, the contents of which are incorporated herein by reference in their entirety.

[Description of Reference Numerals]

1: Knocking sensor (Non-resonant knocking sensor); 10: Sensor body; 11: Metal shell; 12: Shell-side cylindrical section; 13: Shell-side flange section; 18: Piezoelectric element; 22: Weight; 31: Fixing portion; 32: Fixing-side cylindrical section; 33: Fixing-side flange section; 40: Resin molded body.

What is claimed is:

1. A non-resonant knocking sensor comprising:
    a sensor body including:
    a metal shell including a shell-side cylindrical section formed into a cylindrical shape and a shell-side flange section extending radially outward from one end section of the shell-side cylindrical section,
    a piezoelectric element having a through hole into which the shell-side cylindrical section is inserted,
    a weight having a through hole into which the shell-side cylindrical section is inserted and being disposed so that the piezoelectric element is held between the weight and the shell-side flange section, and
    a fixing portion for fixing the weight by pressing the weight toward the shell-side flange section; and
    a resin molded body for covering the sensor body with resin, wherein the fixing portion has a fixing-side cylindrical section into which the shell-side cylindrical section is inserted and at least portions of which are pressed toward an outer circumferential surface of the shell-side cylindrical section so as to be crimped, and a fixing-side flange section, extending from the end section of the fixing-side cylindrical section on the side of the weight, for pressing the weight toward the shell-side flange section,
    wherein the fixing-side cylindrical section includes crimped portions to be radially inwardly crimped and spaced-apart portions which are spaced apart from the shell-side cylindrical section at a plurality of spaced part portions spaced apart in the circumferential direction, and
    wherein a space between the outer circumferential surface of the shell-side cylindrical section and inner circumferential surfaces of the spaced-apart portions are filled with the resin.

2. The non-resonant knocking sensor as claimed in claim 1, wherein the fixing portion and the weight are disposed nearly coaxially, and a thickness t of the fixing-side cylindrical section and a distance d from the inner circumferential surface of the weight to the outer circumferential surface of the shell-side cylindrical section satisfy a relationship of d>t.

3. The non-resonant knocking sensor as claimed in claim 1, wherein
    the sensor body includes an upper insulating plate having a through hole through which the shell-side cylindrical section passes, a lower insulating plate having a through hole through which the shell-side cylindrical section passes, an upper electrode plate having a through hole through which the shell-side cylindrical section passes, and a lower electrode plate having a through hole through which the shell-side cylindrical section passes,
    a stacked body is formed by stacking the lower insulating plate, the lower electrode plate, the piezoelectric element, the upper electrode plate and the upper insulating plate in this order,
    the fixing portion and the stacked body are disposed nearly coaxially, and
    the thickness t of the fixing-side cylindrical section and a distance f between an inner circumferential surface of the stacked body and the outer circumferential surface of the shell-side cylindrical section satisfy a relationship of f>t.

4. The non-resonant knocking sensor as claimed in claim 1, wherein the area of the outer circumferential surface of the shell-side cylindrical section facing the fixing-side cylindrical section is formed into a surface having a cylindrical shape.

5. A method for producing a non-resonant knocking sensor equipped with:
    a sensor body including:
    a metal shell including a shell-side cylindrical section formed into a cylindrical shape and a shell-side flange section extending radially outward from one end section of the shell-side cylindrical section,
    a piezoelectric element having a through hole into which the shell-side cylindrical section is inserted,
    a weight having a through hole into which the shell-side cylindrical section is inserted and being disposed so that the piezoelectric element is held between the weight and the shell-side flange section, and a fixing portion having a fixing-side cylindrical section into which the shell-side cylindrical section is inserted and which is pressed toward the outer circumferential surface of the shell-side cylindrical section and fixed thereto, and a fixing-side flange section extending radially outward from the end section of the fixing-side cylindrical section on the side of the weight; and a resin molded body, made of a resin, for covering the sensor body, the method comprising the steps of:

forming the area of the outer circumferential surface of the shell-side cylindrical section of the metal shell facing the fixing-side cylindrical section into a surface having a cylindrical shape, selecting a weight having a desired thickness from among a plurality of weights having different thicknesses, and stacking the piezoelectric element and the weight in this order from the side of the shell-side flange section, stacking the fixing-side flange section on the weight while being disposed on the side of the weight, and swaging at least portions of the fixing-side cylindrical section at a plurality of spaced apart portions being spaced apart in the circumferential direction so that the fixing portion is fixed to the metal shell, enclosing the sensor body with an injection mold and injecting a liquid resin into an interior of the injection mold to form the resin molded body.

* * * * *